US008630641B2

(12) United States Patent
Kim et al.

(10) Patent No.: US 8,630,641 B2
(45) Date of Patent: Jan. 14, 2014

(54) APPARATUS AND METHOD FOR RESELECTING A PUBLIC LAND MOBILE NETWORK IN A MOBILE COMMUNICATION TERMINAL

(75) Inventors: Yu-Shin Kim, Osan-si (KR); Dong-Won Ryu, Seoul (KR); Yong-Suk Moon, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1822 days.

(21) Appl. No.: 11/761,736

(22) Filed: Jun. 12, 2007

(65) Prior Publication Data

US 2007/0298801 A1    Dec. 27, 2007

(30) Foreign Application Priority Data

Jun. 21, 2006    (KR) .................. 10-2006-0055767

(51) Int. Cl.
*H04W 4/00*    (2009.01)

(52) U.S. Cl.
USPC .................................... 455/435.1; 455/432.1

(58) Field of Classification Search
USPC ............. 455/458, 435.1–435.3, 414.1, 414.2, 455/412.2, 421, 424, 425, 448, 449, 443, 455/418–422.1, 432.1–444, 456.1, 550.1, 455/552.1, 553.1, 556.1, 557; 370/310.2, 370/328, 338
See application file for complete search history.

(56) References Cited

U.S. PATENT DOCUMENTS

| | | | |
|---|---|---|---|
| 6,263,214 B1 * | 7/2001 | Yazaki et al. | 455/558 |
| 7,197,312 B2 * | 3/2007 | Gunaratnam et al. | 455/445 |
| 2002/0197992 A1 * | 12/2002 | Nizri et al. | 455/435 |
| 2004/0224684 A1 * | 11/2004 | Dorsey et al. | 455/434 |

FOREIGN PATENT DOCUMENTS

| | | |
|---|---|---|
| KR | 1020040069573 | 8/2004 |
| WO | WO 2005/009001 | 1/2005 |

* cited by examiner

*Primary Examiner* — San Htun
(74) *Attorney, Agent, or Firm* — The Farrell Law Firm, P.C.

(57) ABSTRACT

Provided are an apparatus and a method for reselecting a Public Land Mobile Network (PLMN) in a mobile communication terminal. The method includes requesting the updating of location registration to a target PLMN after storing current system information, determining whether a Subscriber Identify Module (SIM) card is valid when it fails to update the location registration, and resetting the SIM card to a previous state and then, reading the stored current system information to request the updating of location registration in the current PLMN when the SIM card is invalid.

8 Claims, 9 Drawing Sheets

APPARATUS AND METHOD FOR RESELECTING A PUBLIC LAND MOBILE NETWORK IN A MOBILE COMMUNICATION TERMINAL

PRIORITY

This application claims priority under 35 U.S.C. §119 to an application filed in the Korean Intellectual Property Office on Jun. 21, 2006 and assigned Serial No. 2006-55767, the contents of which are incorporated herein by reference.

BACKGROUND OF THE INVENTION

1. Field of the Invention

The present invention relates generally to an apparatus and a method for reselecting a Public Land Mobile Network (PLMN) in a mobile communication terminal, and in particular, to an apparatus and a method for reselecting a PLMN when a Subscriber Identify Module (SIM) is in an invalid state since a mobile communication terminal receives a location registration update rejection message. In the invalid state, the mobile communication terminal that received the location registration update rejection message does not receive normal services but receives only emergency services (e.g., Nos. 911 and 411).

2. Description of the Related Art

Generally in an asynchronous mobile communication system (e.g., Global System for Mobile communications (GSM) or Wideband Code Division Multiple Access (WCDMA)), a mobile communication terminal first selects a Public Land Mobile Network (PLMN) to perform location registration in an accessible cell in a target PLMN when the mobile communication terminal is turned on.

FIG. 1 is a ladder type diagram illustrating conventional processes of updating location registration.

Referring to FIG. 1, a mobile communication terminal 100 transmits a location registration update request message 106 to a target PLMN 102 when it is necessary to request the updating of a location registration. The target PLMN is requested to transmit the location registration update request message 106 in accordance with priority among a plurality of PLMNs.

It is necessary to request the mobile communication terminal 100 to update location registration in the following cases.

(1) When a Home PLMN (HPLMN) or a Registered PLMN (RPLMN) is tried to be camped on after the mobile communication terminal is turned on, (2) When the HPLMN is looked for and is tried to be camp on in a state where the currently camped on cell is not the HPLMN, (3) When a PLMN having higher priority is tried to be camped on, (4) When a dual mode User Equipment (dual mode UE) moves from a Radio Access Technology (RAT) having lower priority to a RAT having higher priority.

The target PLMN 102 receives the location registration update request message 106 and, when it is determined that the location registration update request message 106 is a normal request message, transmits a location registration update authorization message 108 to the mobile communication terminal 100. The mobile communication terminal 100 that received the location registration update authorization message 108 selects an accessible cell in the target PLMN 102 to be in an idle state 110.

The target PLMN 102 receives the location registration update request message 106 and, when it is determined that there is a problem in the location registration update request message 106, transmits the location registration update rejection message 112 to the mobile communication terminal 100.

The target PLMN transmits the location registration update rejection message 112 to the mobile communication terminal 100 in the following cases.

(1) LAU (LocAtion Update or Location Area Update) Reject Cause #2: IMSI (International Mobile Station Identity) Unknown in Home Location Register (HLR)

wherein, the case (1) occurs when the mobile communication terminal 100 that is not registered in a HLR having mobile communication terminal information, subscription information, location information, and authorization function transmits the location registration update request message 106.

(2) LAU Reject Cause #3: Illegal Mobile Station (MS)

wherein, the case (2) occurs when the mobile communication terminal 100 using an invalid SIM card transmits the location registration update request message 106.

(3) LAU Reject Cause #6: Illegal ME (Mobile Equipment)

wherein, the case (3) occurs when the stolen mobile communication terminal 100 transmits the location registration update request message 106.

The SIM card of the mobile communication terminal 100 that received the location registration update rejection message 112 is in the invalid state so that only an emergency service can be used.

In the conventional art, when an illegal mobile communication terminal tries to perform a location registration in the network states such as (1), (2), and (3), the illegal mobile communication terminal receives the location registration update rejection message from the target PLMN and does not receive a normal service in the invalid state.

However, when a network state is not like the network states (1), (2), and (3), for example, when roaming can be performed between PLMNs due to a roaming agreement among service operators, the location registration update rejection message can be received due to a network error or a network policy in a process of a normal mobile communication terminal performing roaming from the current PLMN to another PLMN.

According to the above description, when the location registration update rejection message is received, the mobile communication terminal cannot receive a normal service in the invalid state. In order to receive the normal service, a user must turn off and then turn on the mobile communication terminal to perform a process of again selecting a PLMN and to perform the location registration.

Therefore, a method of reselecting a PLMN, in which the current PLMN is tried to be camped on again without turning off and then turning on in the invalid state of the normal mobile communication terminal so that the normal service can be used, and an apparatus therefor are required.

SUMMARY OF THE INVENTION

An aspect of exemplary embodiments of the present invention is to substantially solve at least the above problems and/or disadvantages and to provide at least the advantages below. Accordingly, an aspect of exemplary embodiments of the present invention is to provide a method and an apparatus for reselecting a Public Land Mobile Network (PLMN), in which the current PLMN is tried to be camped on again without turning off and then turning on in the invalid state of a normal mobile communication terminal so that a normal service can be used.

Another aspect of exemplary embodiments of the present invention is to provide an apparatus and a method for reselecting a PLMN for resetting a Subscriber Identify Module (SIM) card in an invalid state that is generated due to a network error or a network policy.

A further aspect of exemplary embodiments of the present invention is to provide a method and an apparatus for reselecting a PLMN for executing a timer for limiting the updating of a location registration in accordance with the number of times of failing to update the location registration in a PLMN.

In accordance with an aspect of exemplary embodiments of the present invention, there is provided a method of reselecting a Public Land Mobile Network (PLMN) in a mobile communication terminal that includes requesting the updating of the location registration to a target PLMN after storing current system information, determining whether a Subscriber Identify Module (SIM) card is valid when it fails to update the location registration, and resetting the SIM card to a previous state and then, reading the stored current system information to request the updating of the location registration to the current PLMN when the SIM card is invalid.

According to a further aspect of exemplary embodiments of the present invention, there is provided an apparatus for reselecting a PLMN in a mobile communication terminal that includes a transmitter for requesting the updating of the location registration to a target PLMN, a receiver for receiving a location registration update rejection message for the location registration update request from the target PLMN, and a PLMN update unit for resetting an SIM card and requesting the updating of the location registration to the current PLMN when the SIM card is in an invalid state in a case that the location registration update rejection message is received.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE EXEMPLARY EMBODIMENTS

Exemplary embodiments of the present invention will be described herein below with reference to the accompanying drawings. In the following description, well-known functions or constructions are not described in detail since they would obscure the invention in unnecessary detail.

The present invention provides a technique for reselecting a Public Land Mobile Network (PLMN) in a mobile communication terminal.

Figure 1:
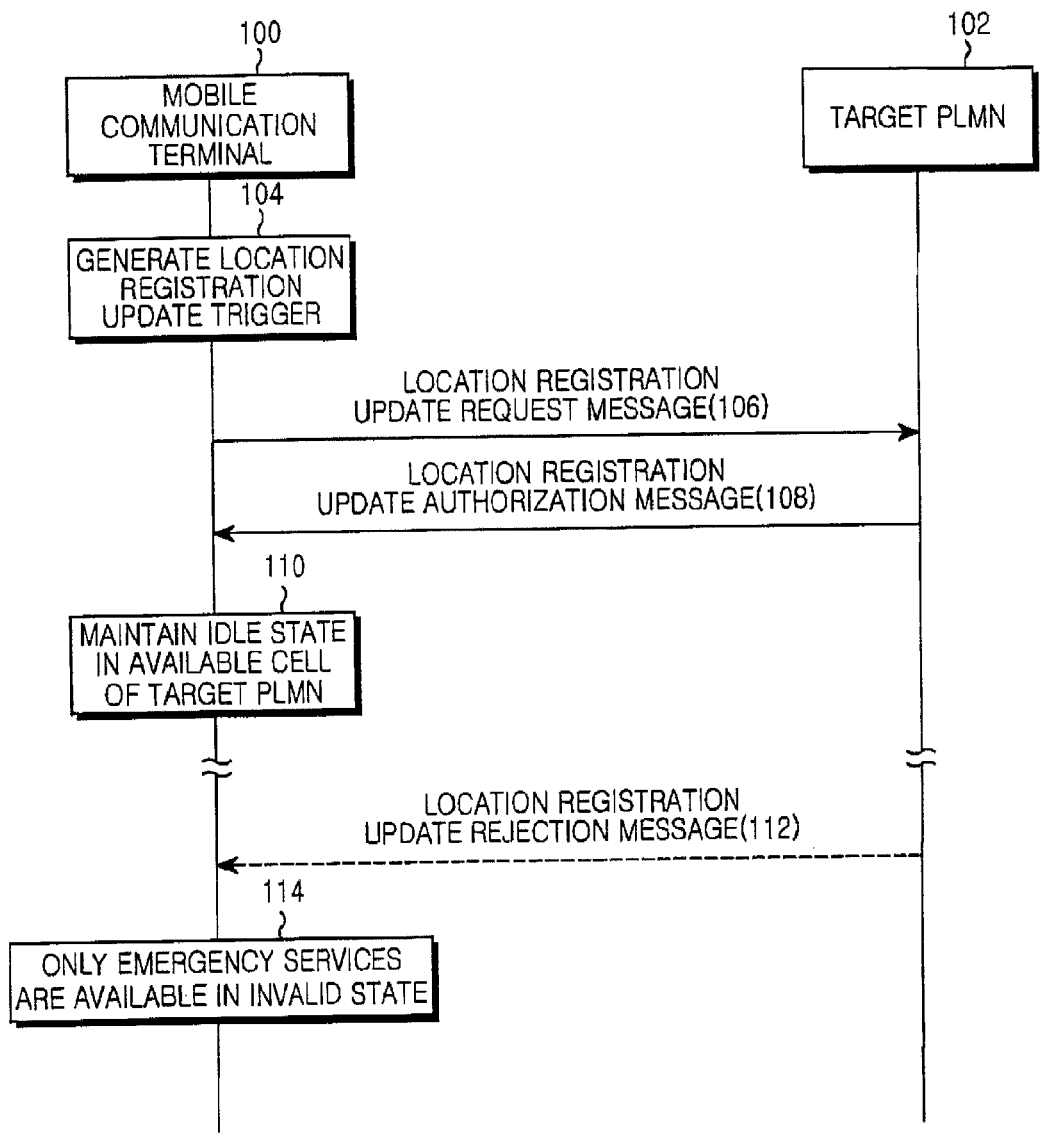
FIG. 1 is a ladder-type diagram illustrating a conventional processes of updating a location registration.
Figure 2:
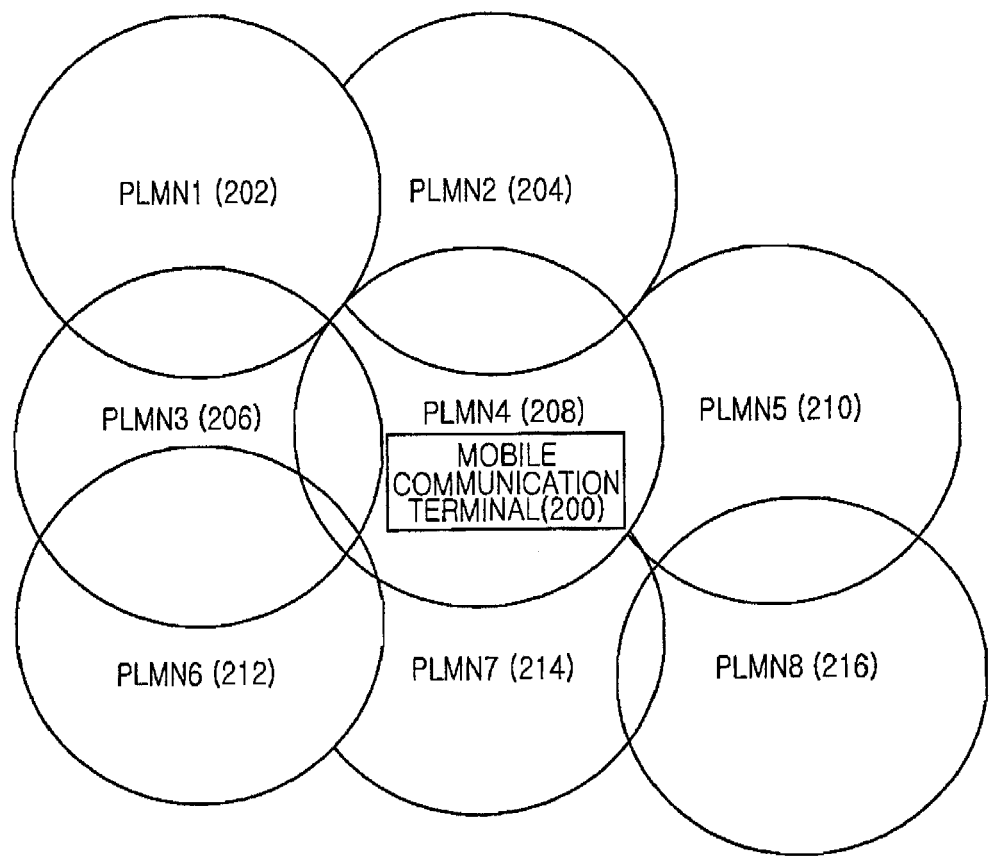
FIG. 2 illustrates a mobile communication terminal positioned in a Public Land Mobile Network (PLMN) among a plurality of PLMNs to perform processes of reselecting a PLMN according to the present invention.

FIG. 2 illustrates a mobile communication terminal positioned in a Public Land Mobile Network (PLMN) among a plurality of PLMNs to perform processes of reselecting a PLMN according to an exemplary embodiment of the present invention.

Referring to FIG. 2, a mobile communication terminal 200 positioned in a PLMN4 208 among a plurality of adjacent PLMNs 202 to 216 to try to reselect a PLMN is illustrated. Here, when a PLMN1 202 is referred to as the Home PLMN (HPLMN) of the mobile communication terminal 200, the PLMN4 208 becomes the Registered PLMN (RPLMN) of the mobile communication terminal 200. Here, the mobile communication terminal periodically looks for the HPLMN or monitors whether there is a PLMN having higher priority than the priority of the PLMN4 208. When a PLMN having higher priority than the priority of the HPLMN is discovered, the mobile communication terminal tries to update location registration.

The PLMNs 202 to 216 are composed of one of a Global System for Mobile communication (GSM), a General Packet Radio System (GPRS), and a Universal Mobile Telecommunication System (UMTS) and at least two different wireless network systems. The mobile communication terminal 200 is provided in the at least one wireless network system among the GSM, the GPRS, and the UMTS to use a service. Also, it is assumed that all of the roaming services are supported among the PLMNs 202 to 216 through a roaming agreement among service operators.

Figure 3:
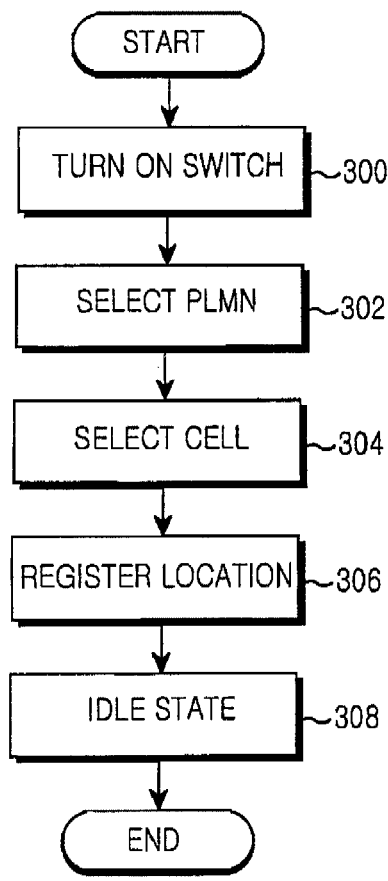
FIG. 3 is a flow chart illustrating processes performed in the idle state of a mobile terminal according to the present invention.

FIG. 3 is a flow chart illustrating processes performed in the idle state of a mobile terminal according to an exemplary embodiment of the present invention.

Referring to FIG. 3, in step 300 when the mobile communication terminal is turned on, the mobile communication terminal scans a control channel (e.g., a Broadcast Control CHannel (BCCH) in the case of the GSM method) and measures the signal magnitude of the control channel to select an available PLMN in step 302. Then, in step 304 in order to receive a service, an available cell in the PLMN is selected ( ) and, in order to receive the service after selecting the cell, the mobile communication terminal scans another control channel (e.g., a Common Control CHannel (CCCH) in the case of the GSM method) to perform the location registration in the cell in step 306. When the location registration is successfully performed, the mobile communication terminal does no occupy traffic, but it is in an idle state where system information is periodically received from a base station.

Figure 4:
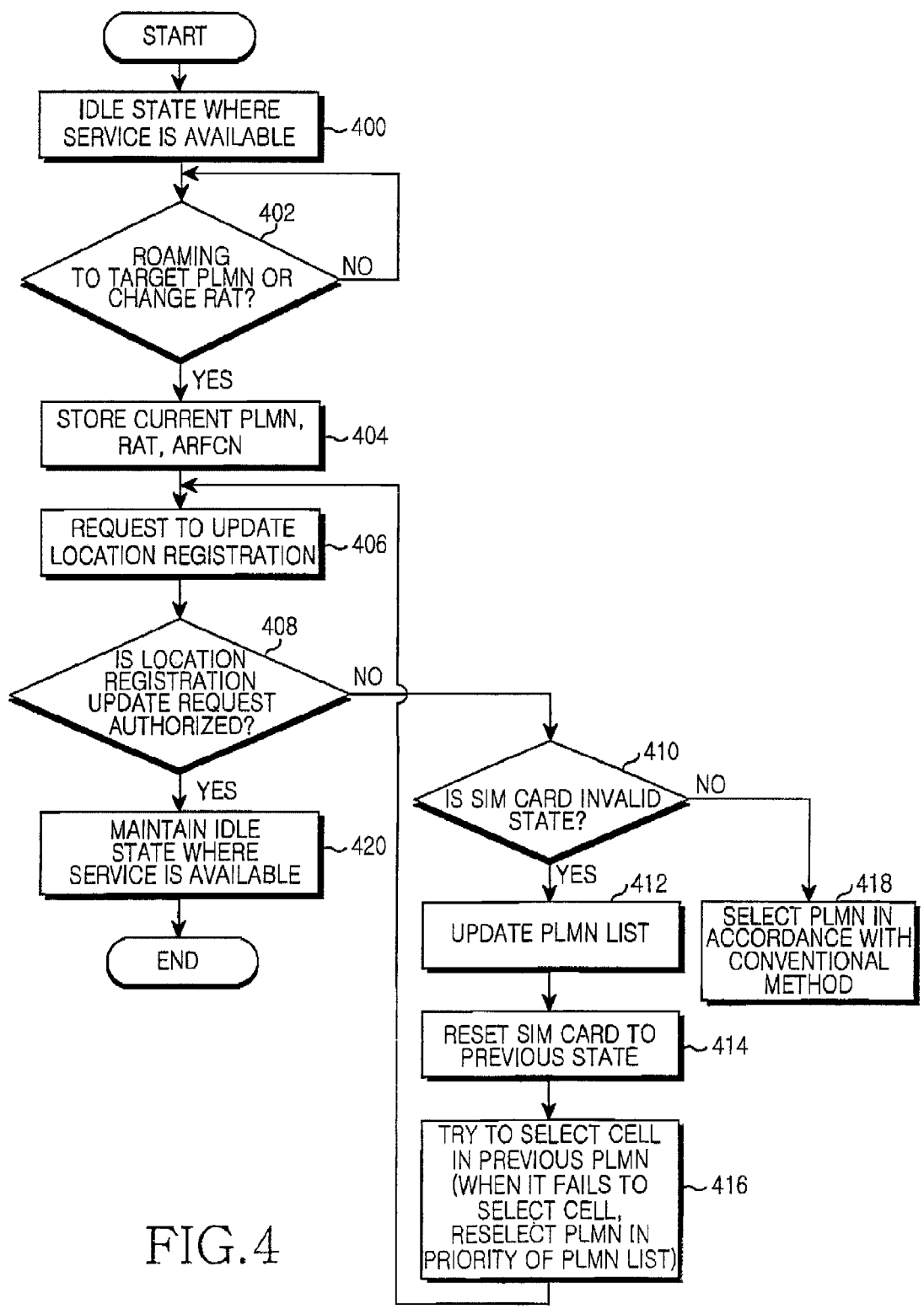
FIG. 4 is a flow chart illustrating processes of updating a location registration according to the present invention.

FIG. 4 is a flow chart illustrating processes of updating the location registration according to an exemplary embodiment of the present invention.

Referring to FIG. 4, in step 400, a mobile communication terminal starts in a normal idle state in accordance with the processes described in FIG. 3. In step 402, it is determined whether the mobile communication terminal tries roaming to a target PLMN or whether it is necessary to change a Radio Access Technology (RAT). If the terminal tries roaming to the target PLMN or it is necessary to change RAT, it proceeds to step 404 to store the current PLMN, RAT, Absolute RF Channel Number (ARFCN) information.

Thereafter, in order to update the location registration, it proceeds to step 406 in which the mobile communication terminal requests the updating of the location registration to the target PLMN. In step 408, when it is determined that the request is normal, the location registration update request is authorized and it proceeds to step 420 in which the mobile communication terminal is in the idle state.

When the location registration update request is rejected due to a network error or by an enterpriser due to the roaming agreement, it proceeds to step 410 in which the state of a Subscriber Identify Module (SIM) card is checked and, when the SIM card is in a valid state, it proceeds to step 418 in which a reselection of PLMN including a procedure of updating the location registration in accordance with a PLMN list is performed.

When the SIM card is in the invalid state, it proceeds to step 412 to update the PLMN list. The PLMN list is updated so that the target PLMN that failed to update the location registration comes last. The number of times of failing to update the location registration is recorded in a storage unit and the PLMN that failed to update the location registration operates a timer that limits the updating of the location registration for a certain period of time in accordance with the number of times of failing to update the location registration.

Thereafter, it proceeds to step 414 to reset the SIM card to a previous state in order to update the location registration again in the current PLMN. In step 416, a cell in the current PLMN is selected, and it then returns to step 406 in which the updating of the location registration is again requested. The information stored in step 402 is used as the information required for updating the location registration in the current PLMN.

Then the algorithm of the present invention is terminated.

Figure 5:
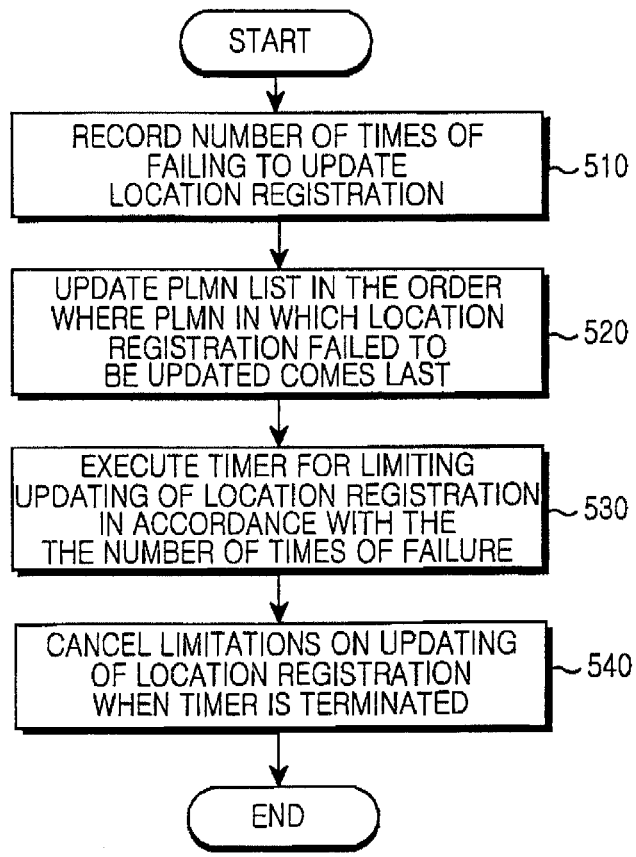
FIG. 5 is a flow chart illustrating processes of updating a PLMN list according to the present invention.

FIG. 5 is a flow chart illustrating processes of updating a PLMN list according to an exemplary embodiment of the present invention.

Referring to FIG. 5, a mobile communication terminal requests the updating of the location registration to a target PLMN. When a location registration update rejection message is received from the target PLMN or when the target PLMN is not found, the number of times of failing to update the location registration is recorded in step 510.

Then, it proceeds to step 520 to update the list so that the PLMN that failed to update the location registration comes last in the PLMN priority list.

Then, it proceeds to step 530 to operate a timer that limits the updating of the location registration in accordance with the number of times of failing to update the location registration. It cannot be requested to update the location registration in the PLMN in which the location registration failed to be updated while the timer operates. Also, the timer operates for five minutes when the number of times of failing to update the location registration is one, for ten minutes when the number of times of failing to update the location registration is two, for fifteen minutes when the number of times of failing to update the location registration is three, for thirty minutes when the number of times of failing to update the location registration is four, for sixty minutes when the number of times of failing to update the location registration is five, and for five hours when the number of times of failing to update the location registration is six. When the location registration continuously fails to be updated for five times, the timer is reset to be operated.

Then, the process of the present invention is terminated.

Figure 6A:
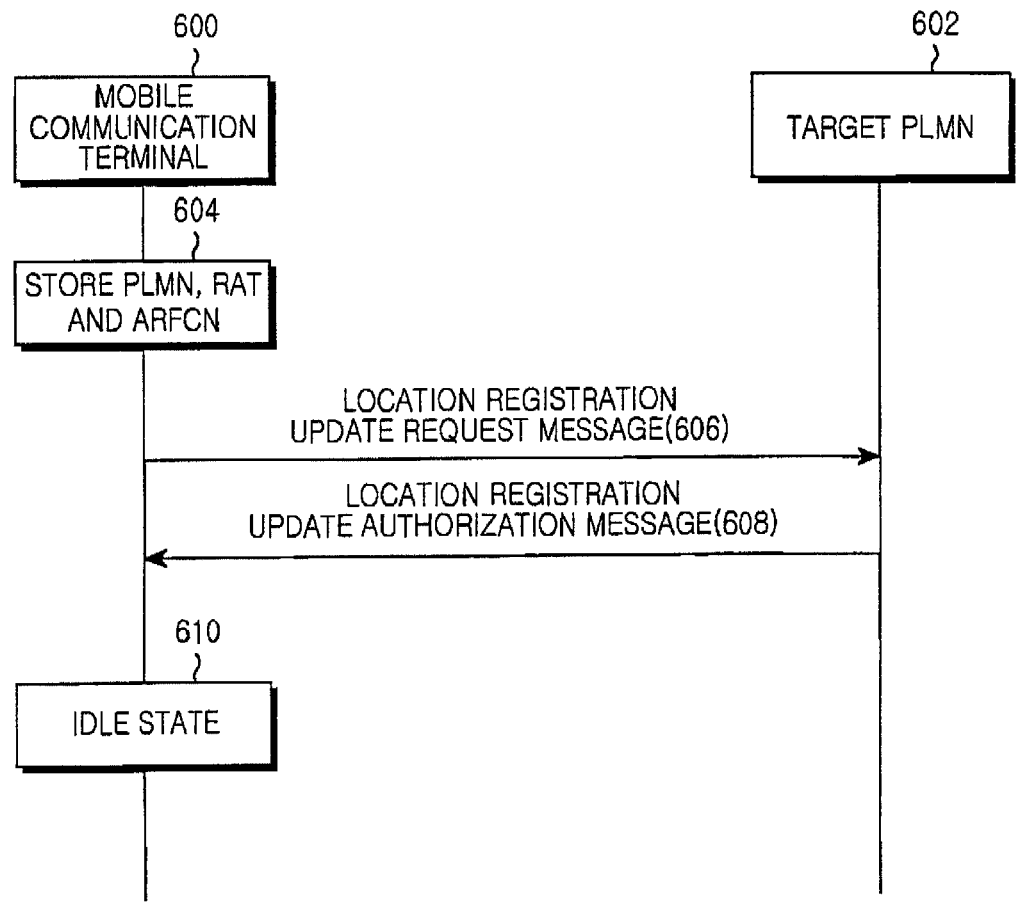
FIG. 6A is a ladder-type diagram illustrating the flowchart of a location registration update signal in which the location registration update request is authorized without failure according to the present invention.

FIG. 6A is a ladder-type diagram illustrating the flowchart of a location registration update signal in which the location registration update request is authorized without failure according to an exemplary embodiment of the present invention.

Referring to FIG. 6A, when it is necessary to update the location registration due to roaming, a mobile communication terminal 600 stores the current PLMN, RAT, and ARFCN information in step 604 and transmits a location registration update request message 606 to a target PLMN 602 in order to perform the location registration in the target PLMN 602. The PLMN 602 checks information on the location registration update request message 606 and, when it is determined that there is no problem, transmits a location registration update authorization message 608 to the mobile communication terminal 600. The mobile communication terminal 600 that received the location registration update authorization message 608 is in an idle state.

Figure 6B:
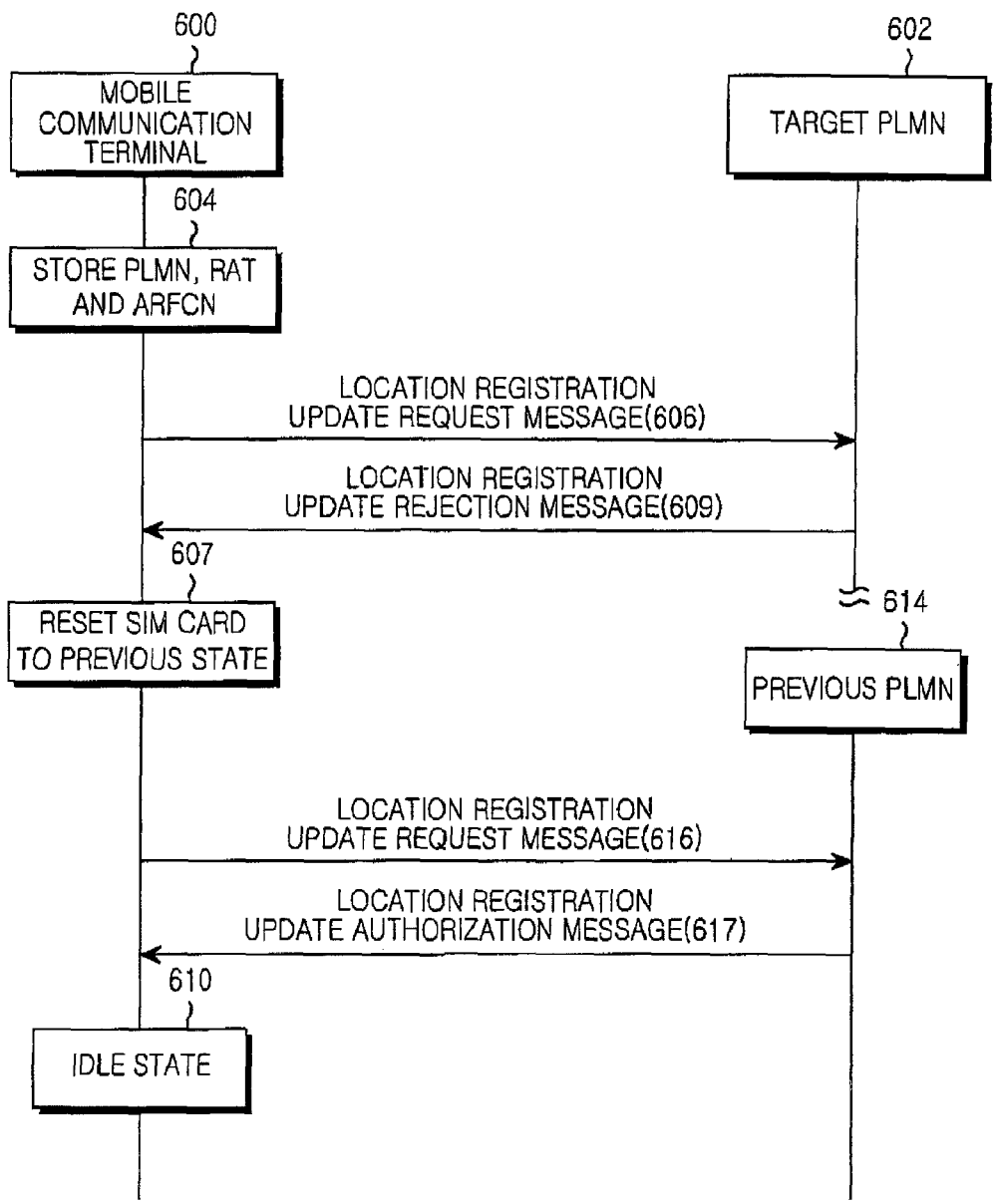
FIG. 6B is a ladder-type diagram illustrating the flowchart of a location registration update signal in which the location registration update request fails once and then, is authorized according to the present invention.

FIG. 6B is a ladder-type diagram illustrating the flowchart of a location registration update signal in which the location registration update request fails once and then, is authorized according to an exemplary embodiment of the present invention.

Referring to FIG. 6B, when it is necessary to update the location registration due to roaming, the mobile communication terminal 600 stores the current PLMN, RAT, and ARFCN information in step 604 and transmits the location registration update request message 606 to the target PLMN 602 in order to perform the location registration in the target PLMN 602. The PLMN 602 checks the information on the location registration update request message 606 and, when it is determined that there is a problem, transmits a location registration update rejection message 609 to the mobile communication terminal 600. The problem is one of the (1) LAU Reject Cause #2: IMSI Unknown in HLR, (2) LAU Reject Cause #3: Illegal MS, and (3) LAU Reject Cause #6: Illegal ME.

The mobile communication terminal 600 that received the location registration update rejection message 609 resets the SIM card to a previous state in order to try to update the location registration in the current PLMN, selects an available cell in a previous PLMN 614 using the stored current PLMN, RAT, and ARFCN information, and transmits a location registration update request message 616 again. Information on the location registration update request message 616 is checked and, when it is determined that there is no problem, a location registration update authorization message 617 is transmitted to the mobile communication terminal 600. The mobile communication terminal 600 that received the location registration update authorization message 617 is in an idle state.

Figure 6C:
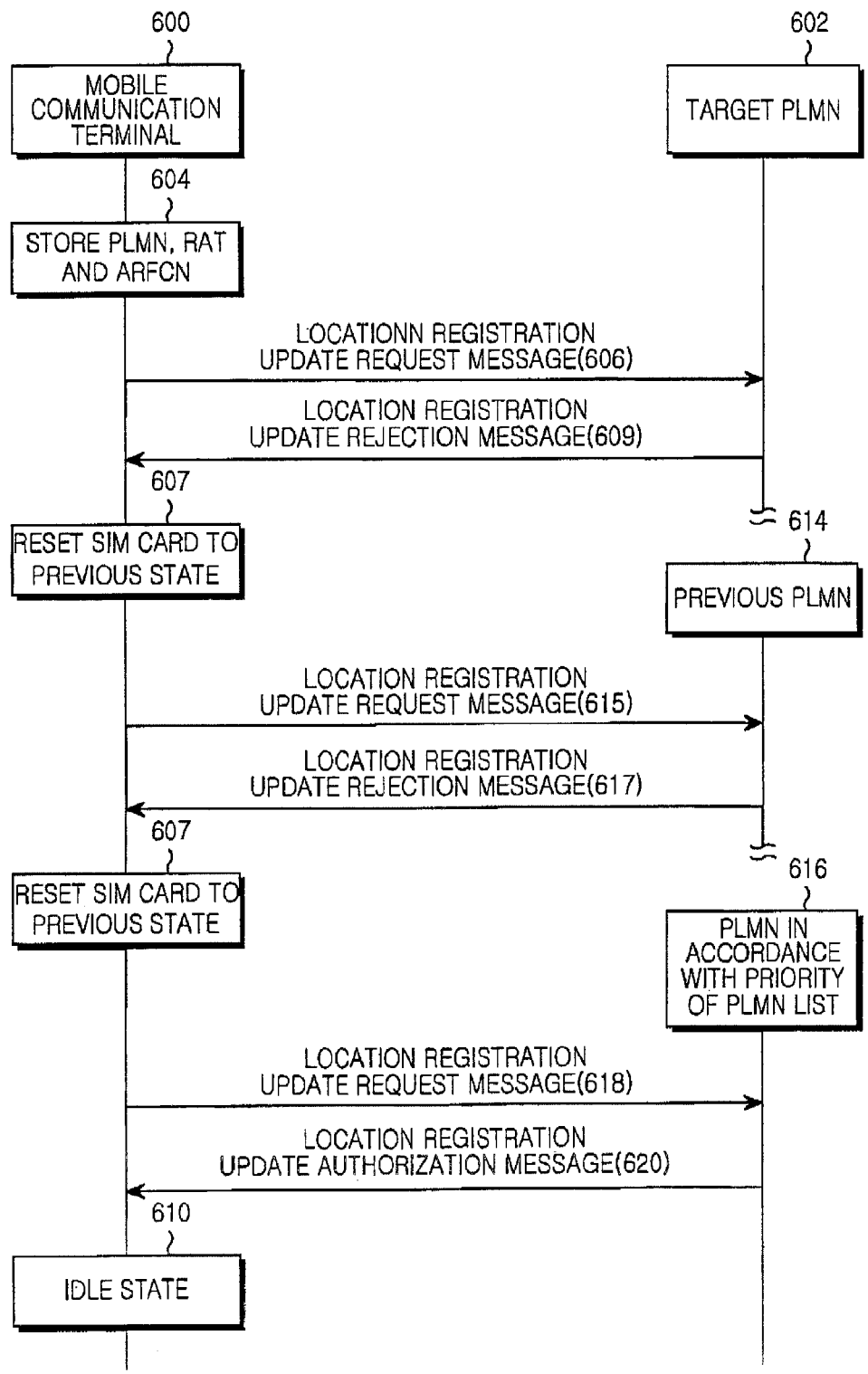
FIG. 6C is a ladder-type diagram illustrating the flowchart of a location registration update signal in which the location registration update request fails at least two times and then, is authorized according to the present invention.

FIG. 6C is a ladder-type diagram illustrating the flowchart of a location registration update signal in which the location registration update request fails no less than two times and then, is authorized according to an exemplary embodiment of the present invention.

Referring to FIG. 6C, when it is necessary to update the location registration due to roaming, the mobile communication terminal 600 stores the current PLMN; RAT, and ARFCN information in step 604 and transmits the location registration update request message 606 to the target PLMN 602 in order to perform the location registration in the target PLMN 602. The PLMN 602 checks the information on the location registration update request message 606 and, when it is determined that there is a problem, transmits the location registration update rejection message 609 to the mobile communication terminal 600. The mobile communication terminal 600 that received the location registration update rejection message 609 resets the SIM card to a previous state in order to try to update the location registration in the current PLMN, selects the available cell in the previous PLMN 614 using the stored current PLMN, RAT, and ARFCN information, and transmits a location registration update request message 615 again. When the previous PLMN 614 does not receive the location registration update request message 615 or when there is a problem in the location registration update request message 615, a location registration update rejection message 617 is transmitted to the mobile communication terminal 600. The mobile communication terminal 600 that received the location registration update rejection message 617 resets the SIM card to a previous state and transmits a location registration update request message 618 to a PLMN 616 having higher priority. The PLMN 616 having higher priority transmits a location registration update authorization message 620 to the mobile communication terminal 600 when it is determined that there is no problem in the location registration update request message 618. Here, the mobile communication terminal 600 tries to request the updating of location registration in the order of the PLMN priority until it is successful in updating the location registration.

Figure 7:
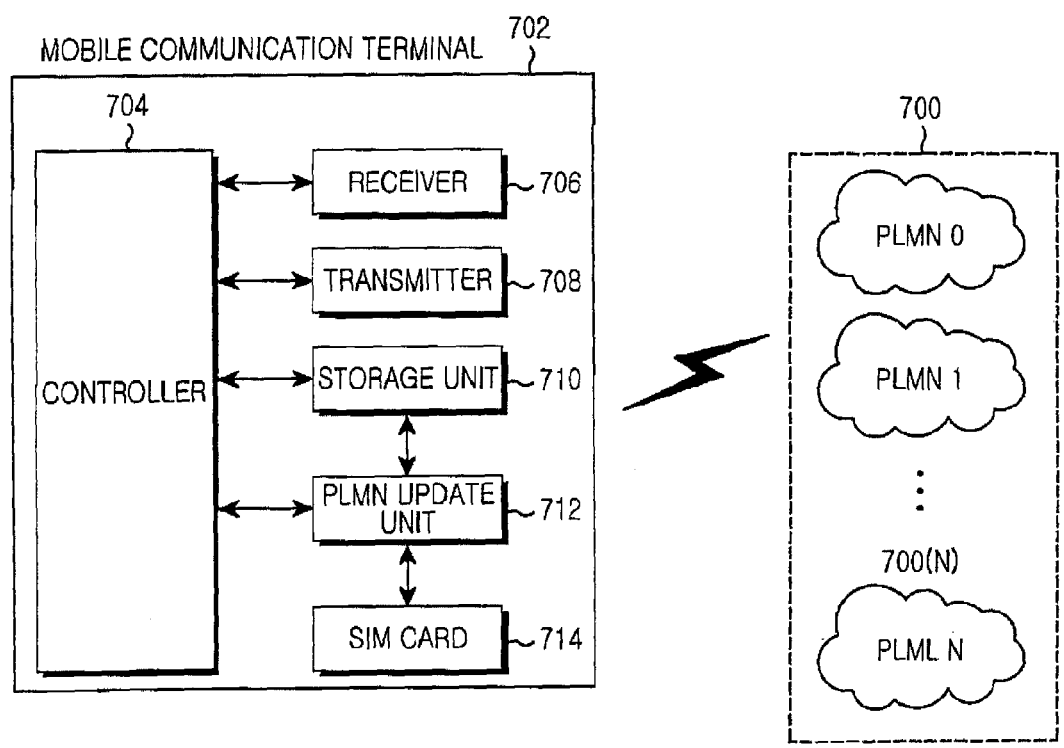
FIG. 7 is a block diagram illustrating an apparatus for reselecting a PLMN in a mobile communication system according to the present invention.

FIG. 7 is a block diagram illustrating an apparatus for reselecting a PLMN in a mobile communication system according to an exemplary embodiment of the present invention.

Referring to FIG. 7, when roaming is performed from one PLMN 700 to another PLMN 700 or it is necessary to change the RAT, a controller 704 stores the current PLMN, RAT, and ARFCN information in a storage unit 710, transmits a location registration update request message to a target PLMN through a transmitter 708, and receives a location registration update authorization message or a location registration update rejection message for the location registration update request through a receiver 706. According to an exemplary the present invention, the controller 704 instructs a PLMN update unit to reset the SIM card to a previous state and to update the location registration in a previous PLMN when the location registration update rejection message is received.

When the location registration update rejection message is received, a PLMN update unit 712 checks the state of an SIM card 714, updates the PLMN list when it is determined that the SIM card 714 is in an invalid state, and resets the SIM card 714 to a previous state to request the updating of location registration in an available cell in the previous PLMN again.

When it fails to update the location registration, the PLMN update unit 706 stores the number of times of failing to update the location registration in the storage unit, executes a timer for limiting the updating of the location registration in the PLMN that failed to update the location registration in accordance with the number of times of failing to update the location registration, and updates the PLMN list in the order where the target PLMN that failed to update the location registration comes last.

As described above, according to an exemplary embodiment of the present invention, it is possible to use the normal service although the mobile communication terminal is not turned off and then turned on in the state where the SIM card is in the invalid state due to the Merge and Association (M&A) among mobile communication enterprisers and the complicated roaming agreement among mobile communication enterprises.

Also, it is possible to compensate for the problem in which the SIM card is in the invalid state due to the network roaming agreement.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for reselecting a Public Land Mobile Network (PLMN) in a mobile communication terminal camped on a first PLMN, the method comprising the steps of:
   determining to request an updating of a location registration from a second PLMN;
   storing system information about the first PLMN to which the mobile communication terminal is registered;
   transmitting a location registration update request to the second PLMN;
   determining whether a Subscriber Identify Module (SIM) card is valid, when the second PLMN fails to update the location registration; and
   when the SIM card is invalid, resetting the SIM card to a previous state as when the mobile communication terminal transmitted a location registration update request to the first PLMN, and transmitting a location registration update request to the first PLMN using the stored system information.

2. The method of claim 1, further comprising the steps of:
   when the second PLMN fails to update the location registration in the first PLMN, recording a number of times of failing to update the location registration;
   updating a PLMN list in an order where the second PLMN that failed to update the location registration comes last;
   executing a timer for limiting the updating of the location registration in accordance with the number of times of failing to update the location registration; and
   canceling limitation on the updating of the location registration when the timer for limiting the updating of the location registration is terminated.

3. The method of claim 2, wherein after the second PLMN fails to update the location registration in the first PLMN, the first PLMN is selected in accordance with an updated priority, and updating the location registration is then requested.

4. The method of claim 1, wherein the system information includes at least one of information on the first PLMN, a Radio Access Technology (RAT) and an Absolute Radio Frequency Channel Number (ARFCN).

5. An apparatus for reselecting a Public Land Mobile Network (PLMN) in a mobile communication terminal that is camped on a first PLMN, the apparatus comprising:
   a transmitter for transmitting a location registration update request;
   a receiver for receiving a location registration update response message for a transmitted location registration update request; and
   a PLMN update unit for:
   determining to request an updating of a location registration from a second PLMN,
   storing system information about the first PLMN to which the mobile communication terminal is registered,
   commanding the transmitter to transmit the location registration update request to the second PLMN,
   when the location registration update response message from the second PLMN indicates denial of the request, determining if a SIM card is invalid, and when the SIM card is invalid, resetting the SIM card to a previous state as when the mobile communication terminal transmitted a location registration update request to the first PLMN and commanding the transmitter to transmit a location registration update request to the first PLMN using the stored system information.

6. The apparatus of claim 5, wherein the PLMN update unit records a number of times of failing to update the location registration; updates a PLMN list in an order where the second PLMN that failed to update the location registration comes last; executes a timer for limiting the updating of the location registration in accordance with the number of times of failing to update the location registration; and cancels the limitation on the updating of the location registration when the timer for limiting the updating of the location registration is terminated.

7. The apparatus of claim 6, wherein after the second PLMN fails to update the location registration, the PLMN update unit selects the first PLMN in accordance with the updated priority and then requests the updating of the location registration.

8. The apparatus of claim 5, wherein the system information comprises at least one of:
information on the first PLMN;
a Radio Access Technology (RAT); and
an Absolute Radio Frequency Channel Number (ARFCN).

* * * * *